United States Patent
Jäger et al.

(10) Patent No.: US 8,573,713 B2
(45) Date of Patent: Nov. 5, 2013

(54) METHOD FOR CONTROLLING A BRAKE SYSTEM OF A MOTOR VEHICLE

(75) Inventors: Markus Jäger, Eschborn (DE); Gregor Schmitt, Regensburg (DE); Jochen Führer, Darmstadt (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 1159 days.

(21) Appl. No.: 11/795,846

(22) PCT Filed: Dec. 16, 2005

(86) PCT No.: PCT/EP2005/056869
§ 371 (c)(1),
(2), (4) Date: Jul. 23, 2007

(87) PCT Pub. No.: WO2006/076999
PCT Pub. Date: Jul. 27, 2006

(65) Prior Publication Data
US 2008/0129110 A1    Jun. 5, 2008

(30) Foreign Application Priority Data

Jan. 21, 2005  (DE) .......................... 10 2005 003 159

(51) Int. Cl.
*B60T 8/64* (2006.01)
(52) U.S. Cl.
USPC ............ 303/151; 303/152; 303/155; 303/178
(58) Field of Classification Search
None
See application file for complete search history.

(56) References Cited

U.S. PATENT DOCUMENTS

| | | | |
|---|---|---|---|
| 3,621,929 A | 11/1971 | Oberthur et al. | |
| 4,398,260 A * | 8/1983 | Takahashi et al. | 701/78 |
| 5,632,534 A | 5/1997 | Knechtges | |
| 5,839,800 A * | 11/1998 | Koga et al. | 303/152 |
| 5,923,093 A | 7/1999 | Tabata et al. | |
| 5,927,829 A | 7/1999 | Saga et al. | |
| 6,425,643 B2 * | 7/2002 | Shirai et al. | 303/112 |
| 6,439,674 B1 | 8/2002 | Niino | |
| 6,655,754 B2 * | 12/2003 | Crombez et al. | 303/152 |
| 6,811,229 B2 * | 11/2004 | Soga | 303/152 |
| 7,059,691 B2 * | 6/2006 | Tsunehara et al. | 303/152 |
| 7,136,737 B2 * | 11/2006 | Ashizawa et al. | 701/70 |
| 7,925,411 B2 * | 4/2011 | Fuhrer et al. | 701/81 |

* cited by examiner

*Primary Examiner* — Thomas Irvin
(74) *Attorney, Agent, or Firm* — Brinks Hofer Gilson & Lione

(57) ABSTRACT

Disclosed is a method for controlling a regenerative brake system with a number of friction brakes (F) and an electro-regenerative brake (R), whose total deceleration is composed of deceleration components of the brakes, and the actual deceleration components are desired to correspond to the nominal deceleration components as exactly as possible. A control unit is used to change the ratio of the nominal deceleration components of a number of brakes (R, F) relative to each other by determining a correction value ($k_1$, $k_2$) for a number of the brakes based on the quantities of efficiency w of a number of brakes representing the ratio between the actual deceleration ($a_{actual}$) and the nominal deceleration ($a_{nominal}$), which correction value is applied to the nominal deceleration ($a_{nominal}$) of these brakes.

11 Claims, 2 Drawing Sheets

METHOD FOR CONTROLLING A BRAKE SYSTEM OF A MOTOR VEHICLE

BACKGROUND OF THE INVENTION

The present invention relates to a method for controlling a brake system, in particular for controlling a regenerative brake system with a number of friction brakes and an electro-regenerative brake.

It is the purpose of regenerative brake systems in motor vehicles to store at least part of the energy produced during braking in the motor vehicle and to re-use it for the drive of the vehicle. This provision allows reducing the energy consumption of the vehicle in total, increasing the efficiency, and thus rendering its operation more economical. To this effect, motor vehicles with a regenerative brake system generally include different types of brakes, also called brake actuators.

Typically, this arrangement employs a number of hydraulic friction brakes, as known from customary motor vehicles, and an electro-regenerative brake. The electro-regenerative brake is generally configured as an electric generator, generating at least part of the total brake output. The produced electric energy is supplied into a storage medium such as an on-board battery, or is fed back, respectively, and is re-used for driving the motor vehicle by way of an appropriate drive.

Regenerative brake systems can be designed as so-called serial regenerative concepts where the component of the brake torque, which is produced by the generator, is as high as possible. In contrast thereto, parallel or so-called residual-moment-based regenerative concepts are known as well, where the brake torque is distributed in predefined ratios to the brake actuators or to individual brakes, e.g. axlewise. Mixed concepts of these two brake concepts are likewise known. It is common to all systems that they use several different brakes for simultaneous braking at least in some ranges of the brake torque to be generated so that the total deceleration is composed of the deceleration components of the mentioned brakes.

The problem involved in regenerative bake systems is that when using different brake actuators, the systems can generate effective brake forces that differ from each other in spite of equal brake force requirements. This becomes noticeable in a negative way especially when shifting the brake requirements from one brake actuator to the other one, if the deceleration components of the brake actuators differ from a defined ratio. To balance these shortcomings, it is possible to apply a static correction factor to one or more of the brake actuators. However, it is not possible to eliminate the drawbacks thereby to full extent because the performance of the brake actuators is related to the vehicle, as e.g. the brake linings can be different due to series deviation during production. In addition, the attainable deceleration values of the brake actuators, such as of the hydraulic friction brake in particular, can vary due to wear and aging. A static correction factor can neither take any influence when exchanging brake elements that wear off, such as brake linings and brake discs, as customary in motor vehicles.

In view of the above, an object of the invention is to disclose a method for controlling a brake system as described hereinabove, wherein the actual deceleration components of the brakes of the total deceleration correspond to the nominal deceleration components as exactly as possible.

SUMMARY OF THE INVENTION

This object is achieved by the invention in that a control unit is used to change the ratio of the nominal deceleration components of a number of brakes relative to each other, because a correction value for a number of brakes is determined from the quantities of efficiency of a number of brakes reflecting the ratio of actual deceleration to nominal deceleration, and the correction value is applied to the nominal deceleration of the brakes.

The invention is based on the reflection that the actual deceleration will differ in the course of time from the nominal deceleration of the brakes of a motor vehicle due to wear, aging and substitution of brake elements such as brake linings. In order to maintain the ratio of the deceleration components of the brakes as exactly as possible with respect to predefined ratios, this deviation should be detected continuously in order to be able to readjust the brakes using this detection of the deviation. The detection of this deviation and the re-adjustment should be carried out dynamically because the deviation of the brakes occurs continuously and is related to the vehicle due to the coefficients of influence described above. To take this fact into account, the detection of the deviation should suitably take place in the vehicle itself and also continuously like the changes of the brakes.

Further, the invention founds on the reflection that the deviation of the actual deceleration components from the nominal deceleration components of the brakes is due to the deviation of the actual deceleration from the nominal deceleration of the brakes. Therefore, the deviation can be realized most appropriately by determining the quantities of efficiency of the brakes, which reflect the ratio between actual deceleration and nominal deceleration. The quantities of efficiency can be balanced one to the other using the control unit or likewise with respect to predefined nominal quantities of efficiency. This allows determining a correction value for a number of brakes, which is applied to the nominal deceleration of these brakes. This application permits compensating the deviation of the actual deceleration from the nominal deceleration of a number of brakes, or rather allows readjusting the brakes. It is sufficient in this respect to readjust only a number of brakes by such application because only the ratio of the deceleration components of a number of brakes is significant.

To be able to apply a correction value to a number of brakes, advantageously, a correction value is applied to the nominal deceleration of a number of brakes because the nominal deceleration is multiplied with this correction value or divided by it.

In brake systems allowing a brake force distribution between the axles, a correction value is preferably determined for a number of brakes being associated with one joint axle. In a motor vehicle with two axles, a common correction value is determined axlewise for the friction brakes, and this correction value is applied to the nominal deceleration of the friction brakes.

To determine a correction value in a simplest possible way, a quantity of efficiency of a brake is preferably employed as a reference. As the total brake deceleration can be readjusted centrally, it is possible to use the quantity of efficiency of one brake as a reference for the readjustment of other brakes by merely modifying the ratio of the nominal decelerations.

Favorably, the efficiency of an electric generator is used as a reference for a number of brakes, which are associated with one joint axle, because the generator hardly exhibits any wear compared to friction brakes, and the reference can thus be maintained constant.

In order to use an efficiency of a brake as a reference, the correction value suitably corresponds to the long-term efficiency ratio of the brakes. Since single measurements can differ greatly from the sliding average efficiency to some extent, it is appropriate to conduct several measurements, hence, to determine the long-term efficiency ratio.

In order to consider brake operations that occur as frequently as possible or similar brake operations, an efficiency ratio of brakes is preferably measured in a predetermined speed range and/or a predetermined deceleration range. Especially preferred are brake operations in medium and high speed ranges until standstill with medium deceleration ranges, because measurements of extreme values can exhibit excessive deviations from the average value. In this respect, a range of measurement of below 20 km/h and a deceleration range of 0.05 to 0.3 g is advisable for the pickup of measuring data. This action should be taken only during 'normal' brake operations, where safety systems such as an anti-lock system (ABS) or an electric stability program (ESP) do not act, in order to obtain realistic test values. Likewise, it should be preferred to use brake operations for the pickup of measuring data where the deceleration request is varied to a comparatively small degree during braking.

To be able to ignore external coefficients of influence when determining the quantities of efficiency, an efficiency ratio of a number of brakes is determined favorably in exactly one brake application. It must be assumed then that the external influences remain comparatively constant during the one brake operation. For a high quality of the test values of the quantities of efficiency, the brake operation suitably has a number of phases of measurement, and the deceleration component of the total deceleration of a number of brakes lies in respectively one phase of measurement above a predetermined minimum component. The efficiency of a number of brakes is this way determined exactly in that phase of measurement in which its deceleration component is comparatively great, with the quantity of measurement being enhanced thereby.

The respective actual deceleration required for the calculation of the efficiency is preferably determined from wheel speed signals or a deceleration sensor.

In a motor vehicle with two axles and an electric generator, a brake operation is suitably split up into three phases of measurement, with the efficiency of the electric generator being determined in a first phase, and the efficiency of the friction brakes of the second axle being determined in a second phase, while the efficiency of the friction brakes of the first axle is determined in a third phase. In this arrangement, the electric generator is connected only to the first axle for a high efficiency.

To achieve a high degree of measuring quality, the minimum component of the electric generator preferably amounts to roughly 0.95 in the first phase, and in the second phase the minimum component of the friction brakes of the second axle amounts to 0.15 and the deceleration component of the friction brakes of the first axle amounts to roughly 0.05 at most, while the minimum component of the friction brakes of the first axle amounts to roughly 0.5 in the third phase of measurement.

For a suitable calculation of the long-term ratios of quantities of efficiency, advantageously, a correction value is determined by filtering measurements of the ratio of quantities of efficiency of a number of brakes. For filtering, most various rules for computing such as the calculation of a sliding average are feasible.

For a simple filtering operation of the test values, which additionally takes into account the variations of the quantities of efficiency of a number of brakes at a comparatively quick rate, a correction value is corrected after each measurement of the ratio of quantities of efficiency favorably by a percentage in the direction of the measured ratio of quantities of efficiency. In this respect, variations in comparison to averaging can occur more quickly by adapting a correction value dynamically. Thus, a correction value merely changes with each new pickup for measuring data of the ratio of quantities of efficiency by a percentage in the direction of the test value, while it remains constant otherwise.

Upon vehicle standstill, a correction value is preferably stored in the control unit of the brake system so that it is available as a starting value with each ignition cycle of the motor vehicle.

To prevent that the driver of the motor vehicle can no longer notice a decrease in effectiveness of a brake due to the readjustment, a correction value is preferably limited by a maximum value. Furthermore, a correction value should be applied only up to the extent of a deceleration requirement, in which shifts of the brake force from one brake to the other brake or to another brake actuator take place still.

The correction value is suitably applied to the nominal deceleration of a number of brakes exclusively in that speed range in which the correction value is determined, and a ramp function of the correction value that approaches the correction value towards the speed range is applied thereto in the fringe areas of the speed range. A ramp function of the correction value is applied at the fringe areas of this speed range in order to prevent an abrupt increase or decrease of the nominal deceleration value of a brake.

Preferably, a brake system of a motor vehicle includes a number of brakes, in particular a number of friction brakes, an electro-regenerative brake and a control unit, and the control unit can control the brake system using the method described.

The advantages achieved by the invention can be seen especially in the possibility of readjusting a number of brakes in brake systems with a number of brake actuators, such as especially a regenerative brake system with a number of friction brakes and an electro-regenerative brake, in such a fashion that the actual deceleration components of the brakes correspond approximately to the nominal deceleration components of the brakes for the service life of the brakes.

Another advantage of the method lies in that a correction value that is determined for the readjustment is adapted dynamically so that any change of the brakes such as wear, aging, or an exchange of brake elements is continuously considered in updating of the correction value. Another advantage resulting therefrom is that the method is functioning in a way related to the vehicle, and the specific characteristics of the brakes of the vehicle are taken into account.

The readjustment allows achieving a lasting optimal total deceleration of the motor vehicle during the service life of the brakes. In addition, the constant control of the respective ratio of deceleration components permits maintaining the brake feel of the driver constant and uniform, in particular during exactly one brake operation.

Another advantage resides in the possibility of performing an axlewise readjustment of brakes so that appropriate brake force distribution and an axlewise differing wear of friction brakes can be considered.

One embodiment of the invention will be explained in detail by way of FIGS. 1 and 2.

DETAILED DESCRIPTION OF THE DRAWINGS

Figure 1:
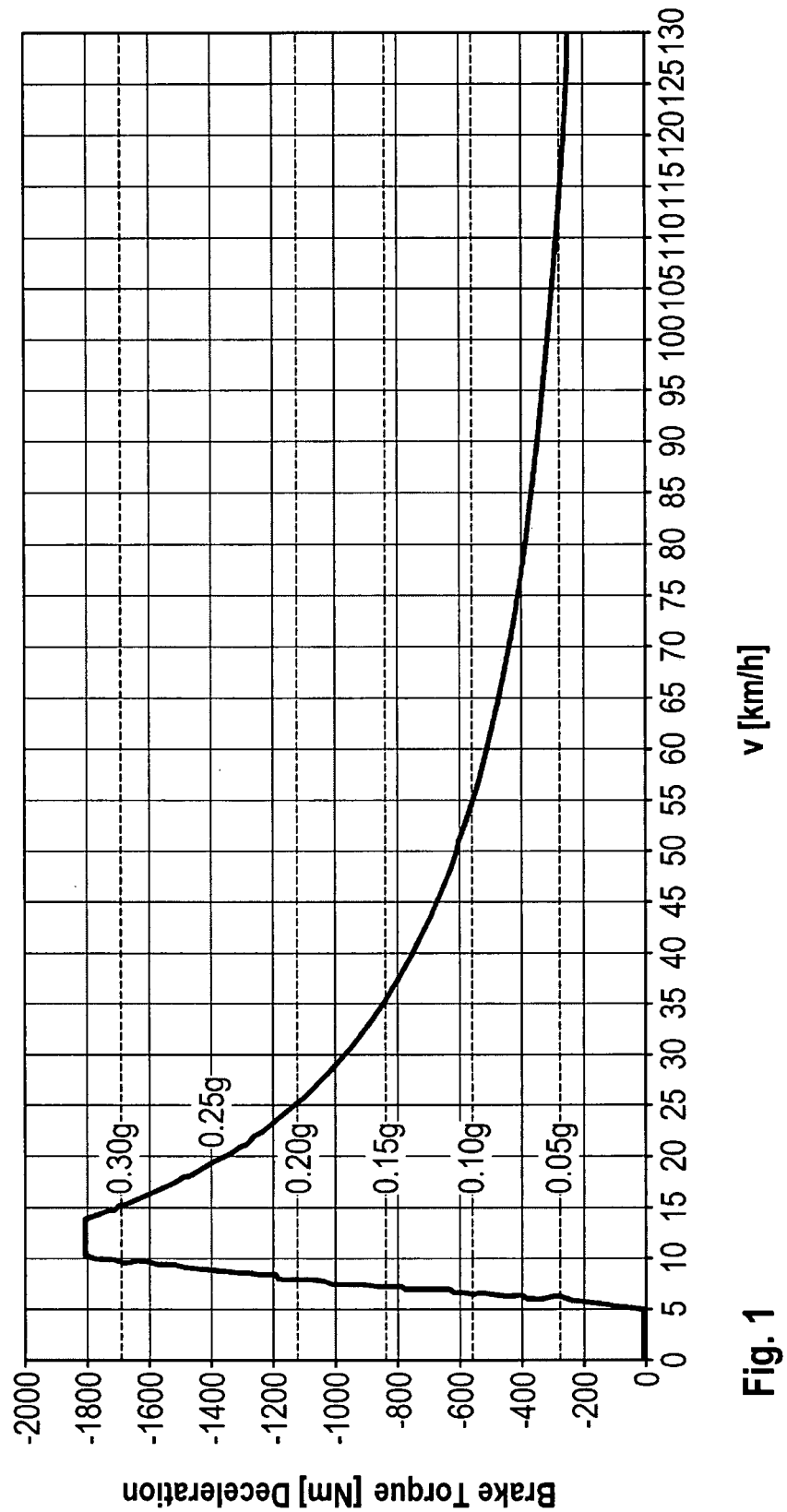
FIG. 1 shows the brake torque of an electro-regenerative brake of a brake system of a motor vehicle as a function of the speed of the motor vehicle.

The explanations for the abbreviations in the formulas can be taken from the list of reference numerals and the list of the indices.

To reduce the energy consumption of a motor vehicle, the vehicle is equipped with a regenerative brake system. The latter in turn is equipped with a number of hydraulic friction brakes F and an electro-regenerative brake being configured as an electric generator R. The brake energy generated in the generator R is stored temporarily in an on-board battery and is used for driving the motor vehicle. To this end, the motor vehicle is driven, in addition to an internal combustion engine, by the electric generator R, which can be operated as an electric motor in addition to its generator function, because the energy stored in the on-board battery is fed back into the generator.

For low friction and, thus, high efficiency of the electric generator R, the latter is connected only to the front axle of the motor vehicle, while the front and the rear axles include two friction brakes F each.

The maximum generator brake torque of vehicles with a regenerative brake is responsive to the generator rotational speed and, thus, also to the driving speed in general. Depending on the driving speed and the deceleration request, the generator brake torque can produce a value ranging between 0% and 100% of the total brake torque.

For a great total deceleration, with simultaneous great reutilization of energy, the ratio between the deceleration components of the friction brakes F and the generator R of the total deceleration is controlled as a function of the speed. The maximum generator brake torque of the generator R is illustrated in FIG. 1. As can be seen in the Figure, the total brake energy is generated by the electric friction brakes F in the speed range between 0 and 5 km/h and by the generator R in the speed range from 10 to 20 km/h. In the other speed ranges, the entire space of the ratio components is covered, as can also be taken from FIG. 1.

In order to be able to maintain the desired deceleration ratio of the generator R and the friction brakes F also in the event that the actual deceleration $a_{actual}$ differs from the nominal deceleration $a_{nominal}$ of the friction brakes F due to wear effects, the friction brakes F are readjusted electronically by means of a control unit. As this occurs, the brake force distribution and different degrees of wear of the friction brakes F of the two axles R are taken into consideration by individually readjusting the friction brakes F of the front and the rear axle in each case axle wise.

To this end, the correction value $k_1$ is applied to the nominal deceleration $a_{nominal}$ of the friction brakes F of the front axle, while the correction value $k_2$ is applied to the friction brakes F of the rear axle. Correction values $k_1$ and $k_2$ are produced from a number of efficiency ratios $$k_{s1} = \frac{w_{F1}}{w_R} \text{ and } k_{s2} = \frac{w_{F2}}{w_R}$$

of the respective friction brakes F and the electric generator R.

In order to be able to ignore external coefficients of influence in determining the quantities of efficiency $w_R$, $w_{F1}$, and $w_{F2}$, the quantities of efficiency $w_R$, $w_{F1}$, and $w_{F2}$ are measured during a joint brake operation.

Figure 2:
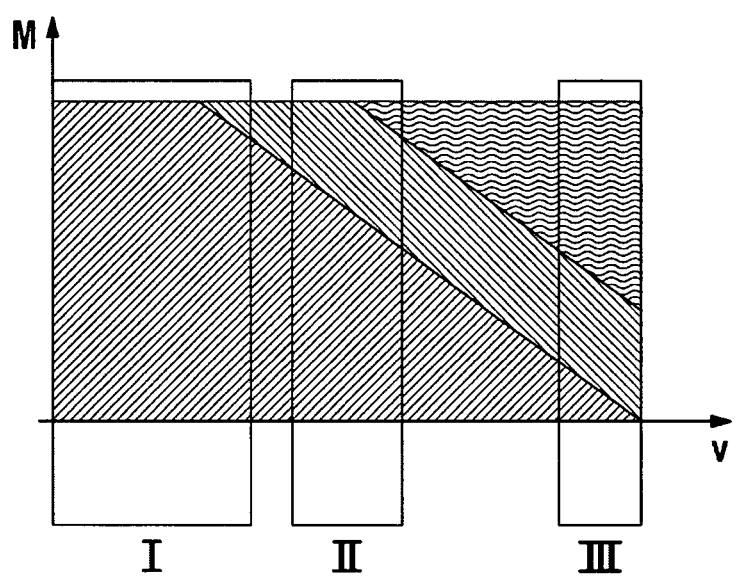
FIG. 2 shows the brake force distribution of brakes in a brake operation including three phases as a function of the speed.

As can be seen in FIG. 2, this brake operation includes three speed-responsive phases of measurement I, II and III. The three phases of measurement are arranged in the speed range of a brake operation in such a fashion that the brake torque of the generator R, the brake torque of the friction brakes R of the front axle and that one of the friction brakes F of the rear axle in each case exhibits a selectable minimum component of the total brake torque in a selected phase of measurement. In this arrangement, the efficiency $w_R$, $w_{F1}$ and $w_{F2}$ of those brakes is respectively measured in the phases of measurement I, II and III, whose brake torque component lies above the individual minimum component or is comparatively high in this phase of measurement. In FIG. 2, the range that is shaded from the bottom left to the top right shows the brake torque component of the electric generator R, the range that is shaded from the top left to the bottom right shows the brake torque component of the friction brakes F of the front axle, and the undulated range shows the brake torque component of the friction brakes F of the rear axle.

In the first phase of measurement I, the efficiency $w_R$ of the electric generator R is therefore determined, while in the second phase II the efficiency $w_{F2}$ of the friction brakes F of the rear axle and in the third phase II the efficiency $w_{F1}$ of the friction brakes F of the front axle is determined.

The minimum component of the electric generator R in the first phase I amounts to roughly 0.95, in the second phase II the minimum component of the friction brakes F of the rear axle amounts to roughly 0.15, and in the third phase of measurement the minimum component of the friction brakes of the front axle amounts to roughly 0.5. The deceleration component of the friction brakes F of the front axle in the phase of measurement II should amount to roughly 0.05 at most.

To obtain high-quality and reproducible test values, exclusively brake operations of in excess of 20 km/h, brake operations with a deceleration between 0.05 and 0.3 g and brake operations, in which the variation of the deceleration request during the brake operation is comparatively insignificant, are considered.

The actual deceleration $a_{actual}$ amounts to $a_{actual}^{I} = w_R \cdot a_{nominal,R}^{I} + w_{F1} \cdot a_{nominal,F1}^{I} + w_{F2} \cdot a_{nominal,F2}^{I}$ in the phase of measurement I, $a_{actual}^{II} = w_R \cdot a_{nominal,R}^{II} + w_{F1} \cdot a_{nominal,F1}^{II} + w_{F2} \cdot a_{nominal,F2}^{II}$ in measurement phase II, and $a_{actual}^{III} = w_R \cdot a_{nominal,R}^{III} + w_{F1} \cdot a_{nominal,F1}^{III} + w_{F2} \cdot a_{nominal,F2}^{III}$ in measurement phase III.

The quantities of efficiency $w_R$, $w_{F1}$, and $w_F$ are calculated based on an equation system of these three equations using the control unit.

As a correction value $k_1$ and $k_2$, a value of $k_{s1}$ and $k_{s2}$ that is averaged over a long period of time is used rather than $k_{s1}$, or $k_{s2}$. To prevent major fluctuations of $k_1$ and $k_2$, while allowing quick consideration of variations of the friction brakes F nevertheless, $k_1$ and $k_2$ are adapted dynamically by changing $k_1$ and $k_2$ with each measurement of $k_{s1}$ and $k_{s2}$ by a component of 0.01 of $k_1$ and $k_2$ in the direction of $k_{s1}$ or $k_{s2}$, respectively. In this arrangement, $k_1$ and $k_2$ are stored in the control unit so that $k_1$ and $k_2$ are available as a starting value with each ignition cycle of the motor vehicle.

In order to apply the correction values $k_1$ and $k_2$ to the nominal decelerations $a_{nominal,F1}$ and $a_{nominal,F2}$ of the friction brake F, the nominal deceleration $a_{nominal,F1}$ and $a_{nominal,F2}$ of the friction brake F is multiplied by the reciprocal value of $k_1$ and $k_2$ in order to determine corrected nominal values $a_{nominal,F1}^{*}$ and $a_{nominal,F2}^{*}$:

$$a^*_{nominal,F1} = a_{nominal,F1} \cdot \frac{1}{k_1}, \quad a^*_{nominal,F2} = a_{nominal,F2} \cdot \frac{1}{k_2}$$

Due to this computing operation, the efficiency $w_R$ of the electric generator R is used as a reference for the readjustment of the friction brakes F.

To prevent false or excessive readjustment of the friction brakes F, the application of the correction factors $k_1$ and $k_2$ to the nominal decelerations $a_{nominal,F1}$ and $a_{nominal,F2}$ is performed only in the working ranges in which the correction values $k_1$ and $k_2$ are determined, i.e. below 20 km/h. To prevent an abrupt change of the brake deceleration ratio of the friction brake F and the electric generator R, a ramp function of the correction values $k_1$ and $k_2$ is applied to the nominal decelerations $a_{nominal,F1}$ and $a_{nominal,F2}$ of the friction brakes F in the range between 25 and 15 km/h. In this arrangement, the values applied will slowly approach $k_1$ and $k_2$ until these are reached at 15 km/h.

LIST OF REFERENCE NUMERALS $a_{nominal}$ nominal deceleration
$a_{nominal}^*$ corrected nominal deceleration
$a_{actual}$ actual deceleration
$k_s$ efficiency ratio
k correction value
w efficiency
F friction brake
R generator
I first phase of measurement
II second phase of measurement
III third phase of measurement
Indices
1 front axle
2 rear axle

The invention claimed is:

1. A method for controlling a brake system of a motor vehicle, which includes an electronic control unit, an electric generator and a number of friction brakes being associated with axles of the motor vehicle, and the total deceleration of which is composed of a first deceleration component provided by the electric generator and a second deceleration component provided by the friction brakes, the method changing the ratio of nominal values of the deceleration components relative to each other comprising the steps of:
   measuring an actual deceleration;
   determining a first nominal deceleration for a first subset of the number of friction brakes, the first subset being associated with one common first axle, a second nominal deceleration for a second subset of the number of friction brakes, the second subset being associated with one common second axle, and a third nominal deceleration for the electric generator, during each of a plurality of measurement phases during one brake application, each measurement phase having a respective predetermined minimum of at least one of the first and second deceleration components and the first deceleration component contributing more than half of the total deceleration of the motor vehicle in at least one of the measurement phases;
   determining a first efficiency ratio for the first subset of the number of friction brakes, the first efficiency ratio representing a ratio between the actual deceleration and the first nominal deceleration;
   determining a second efficiency ratio for the second subset of the number of friction brakes, the second efficiency ratio representing a ratio between the actual deceleration and the second nominal deceleration;
   determining a third efficiency ratio for the electric generator, the third efficiency ratio representing a ratio between the actual deceleration and the third nominal deceleration;
   determining a first correction value from the first efficiency ratio and the third efficiency ratio;
   determining a second correction value from the second efficiency ratio and the third efficiency ratio;
   applying the first correction value to the first nominal deceleration; and
   applying the second correction value to the second nominal deceleration.

2. The method as claimed in claim 1, wherein the first correction value is applied to the first nominal deceleration by multiplying or dividing the first nominal deceleration by the first correction value, and wherein the second correction value is applied to the second nominal deceleration by multiplying or dividing the second nominal deceleration by the second correction value.

3. The method as claimed in claim 1, wherein the first correction value corresponds to a long-term efficiency ratio of the first subset and the second correction value corresponds to a long-term efficiency ratio of the second subset.

4. The method as claimed in claim 1, comprising the step of determining at least one of the first and second efficiency ratios in at least one of the following predetermined ranges: a speed range and a deceleration range.

5. The method as claimed in claim 4, wherein the at least one of the first and second correction values is determined from filtering measurements of the first or second efficiency ratio associated with the at least one of the first and second correction values.

6. The method as claimed in claim 1, wherein the first efficiency ratio of the first subset and the second efficiency ratio of the second subset are calculated by calculating quantities of efficiency ($w_R$, $w_{F1}$, $w_{F2}$) out of the equation system $$a_{actual}^{I} = w_R \cdot a_{nominal,R}^{I} + w_{F1} \cdot a_{nominal,F1}^{I} + w_{F2} \cdot a_{nominal,F2}^{I}$$

$$a_{actual}^{II} = w_R \cdot a_{nominal,R}^{II} + w_{F1} \cdot a_{nominal,F1}^{II} + w_{F2} \cdot a_{nominal,F2}^{II}$$

$$a_{actual}^{III} = w_R \cdot a_{nominal,R}^{III} + w_{F1} \cdot a_{nominal,F1}^{III} + w_{F2} \cdot a_{nominal,F2}^{III}$$

in which
   $a_{actual}$ is the actual deceleration of the brake system,
   $a_{nominal,R}$ is the nominal deceleration of the electric generator,
   $a_{nominal,F1}$ is the nominal deceleration of the first subset,
   $a_{nominal,F2}$ is the nominal deceleration of the second subset,
   $w_{F1}$ is the efficiency of the first subset,
   $w_{F2}$ is the efficiency of the second subset,
   $w_R$ is the efficiency of the electric generator,
   $^{I}$ refers to a first of the plurality of measurement phases,
   $^{II}$ refers to a second of the plurality of measurement phases, and
   $^{III}$ refers to a third of the plurality of measurement phases;
in the plurality of measurement phases, and the electric generator is connected to the first or the second axle.

7. The method as claimed in claim 1, wherein at least one of the first and second correction values is applied to the nominal deceleration of the first or second subset, associated with the at least one of the first and second correction values exclusively in a speed range up to an upper limit, in which the at least one of the first and second correction values is determined, and a ramp function of the at least one of the first and second correction values that approaches the at least one of the first and second correction values towards the speed range is applied thereto in fringe areas of the speed range within a speed band that includes the upper limit.

8. A method for controlling a brake system of a motor vehicle, which includes an electronic control unit, an electric generator and a number of friction brakes being associated with axles of the motor vehicle, and the total deceleration of which is composed of a first deceleration component provided by the electric generator and a second deceleration component provided by the friction brakes, the method changing the ratio of nominal values of the deceleration components relative to each other comprising the steps of:

measuring an actual deceleration;

determining a first nominal deceleration for a first subset of the number of friction brakes, the first subset being associated with one common first axle, a second nominal deceleration for a second subset of the number of friction brakes, the second subset being associated with one common second axle, and a third nominal deceleration for the electric generator, during each of a plurality of measurement phases during one brake application, each measurement phase having a respective predetermined minimum of at least one of the first and second deceleration components and the first deceleration component contributing more than half of the total vehicle deceleration in at least one of the measurement phases, determining a first efficiency ratio for the first subset of the number of friction brakes, the first efficiency ratio representing a ratio between the actual deceleration and the first nominal deceleration;

determining a second efficiency ratio for the second subset of the number of friction brakes, the second efficiency ratio representing a ratio between the actual deceleration and the second nominal deceleration;

determining a third efficiency ratio for the electric generator, the third efficiency ratio representing a ratio between the actual deceleration and the third nominal deceleration;

determining a first correction value from the first efficiency ratio and the third efficiency ratio;

determining a second correction value from the second efficiency ratio and the third efficiency ratio;

applying the first correction value to the first nominal deceleration; and applying the second correction value to the second nominal deceleration;

wherein the minimum deceleration component of the electric generator amounts to roughly 0.95 of the vehicle deceleration in a first phase of measurement, and in a second phase of measurement the minimum deceleration component of the friction brakes of the second axle amounts to 0.15 of the total deceleration of the motor vehicle and the deceleration component of the friction brakes of the first axle amounts to at most roughly 0.05 of the total deceleration of the motor vehicle, while the minimum deceleration component of the friction brakes of the first axle amounts to roughly 0.5 of the total deceleration of the motor vehicle in a third phase of measurement, with the electric generator being connected to the first axle.

9. The method as claimed in claim 1, wherein each of the first and the second correction values after a measurement of the first and second efficiency ratio is corrected by a percentage in the direction of the measured first or second efficiency ratio, respectively.

10. The method as claimed in claim 1, comprising the step of storing the first and the second correction values in the control unit of the brake system.

11. The method as claimed in a claim 1, wherein each of the first and the second correction values is limited by at least one of a maximum value and a minimum value.

* * * * *